April 21, 1964   M. A. HUSBY   3,129,638
DEBURRING ATTACHMENT FOR GEAR CUTTERS
Filed Oct. 14, 1960   2 Sheets-Sheet 1

INVENTOR.
MARVIN A. HUSBY

April 21, 1964  M. A. HUSBY  3,129,638
DEBURRING ATTACHMENT FOR GEAR CUTTERS
Filed Oct. 14, 1960  2 Sheets-Sheet 2

INVENTOR.
MARVIN A. HUSBY
BY
Moore, White & Burd
ATTORNEYS

United States Patent Office 3,129,638
Patented Apr. 21, 1964

3,129,638
DEBURRING ATTACHMENT FOR GEAR CUTTERS
Marvin A. Husby, Minneapolis, Minn., assignor to Washington Scientific Industries, Inc., Minneapolis, Minn., a corporation of Minnesota
Filed Oct. 14, 1960, Ser. No. 62,699
4 Claims. (Cl. 90—1.4)

This invention relates to an improved deburring mechanism adapted for use in conjunction with a gear cutting machine to remove burrs and the like from small gears and pinions simultaneously as the gear teeth are being cut, and whereby such burrs may be quickly and completely removed from the gears or pinions during the gear cutting operation.

An object of the present invention is to provide a gear deburring attachment for gear hobbing machines which utilizes a straight cutting tool for engaging and removing the burrs.

A further object of the invention is to provide a gear deburring attachment comprising a base member adjustably mounted on the gear cutting machine and having a tool supporting block mounted for pivotal movement thereon about a vertical axis, said supporting block carrying a deburring tool and having means for accurately positioning the cutting tool with respect to the side face or end of the gear to be deburred.

A further object is to provide a gear deburring attachment for a conventional gear cutting machine having means for readily mounting it thereon and whereby the cutting tool may be swung to an out-of-the-way position to facilitate the removal of the finished gear from the machine and the insertion of another gear blank into the machine.

Other objects of the invention is to provide a gear deburring attachment of the class described which may be assembled as a complete unit before attaching it to the gear cutting machine; in the provision of such an attachment having means for quickly adjusting it from one position to another to accommodate different size gears and having a so called universal adjustment whereby the cutting tool may be accurately positioned with respect to the gear teeth to assure complete removal of the burrs from the gear; in the unique construction of the base block or member for supporting the deburring tool, and the manner of mounting it on the machine frame; in the provision of the tool supporting block and its pivotal movement about a vertical axis between opposed spring loaded studs whereby the cutting tool is held in deburring engagement with the gear under a light spring pressure, thereby to assure complete removal of the burrs from the gear; and in the provision of such an attachment which is extremely simple and inexpensive to construct and which may readily and quickly be applied to a conventional gear cutting machine without the use of special tools.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

Figure 1:
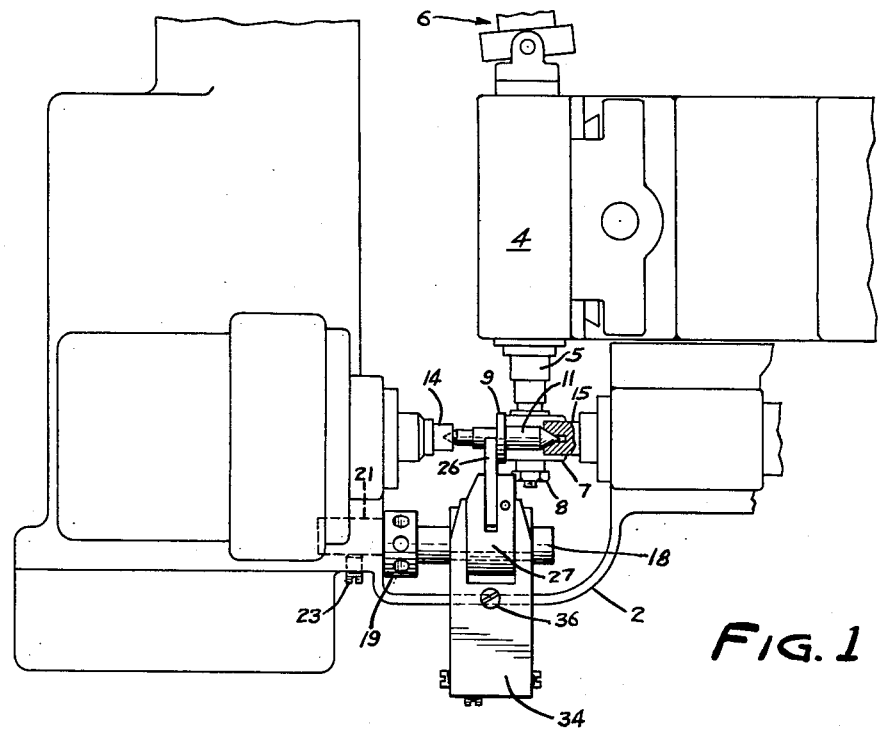
FIGURE 1 is a plan view of a portion of a gear cutting machine showing the invention applied thereto.
Figure 2:
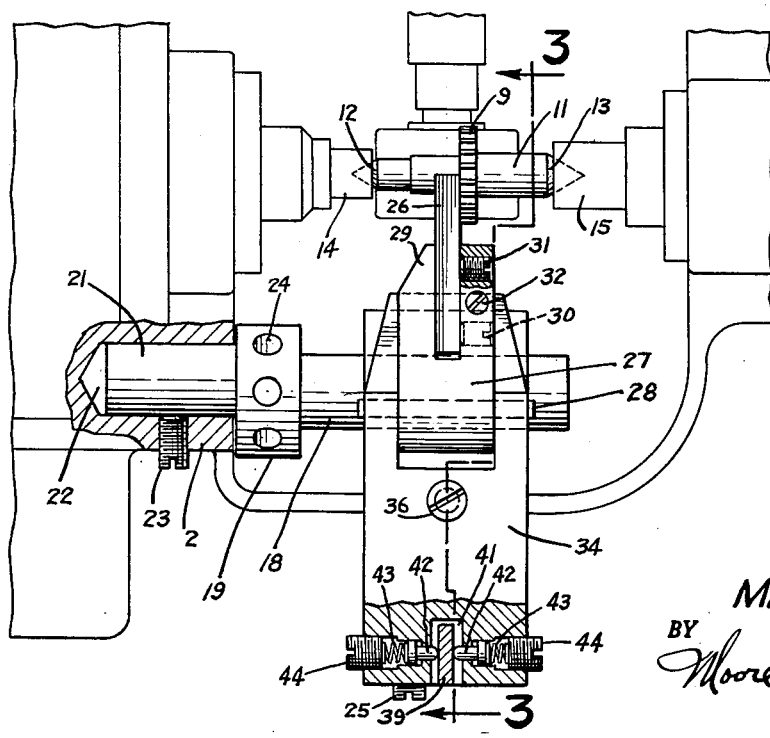
FIGURE 2 is a view similar to FIGURE 1, on a larger scale, with some of the parts broken away, showing the means for locking the cutting tool in the tool holder, and also showing the spring loaded studs for resisting swinging movement of the pivoted tool holder supporting block about its vertical axis.
Figure 3:
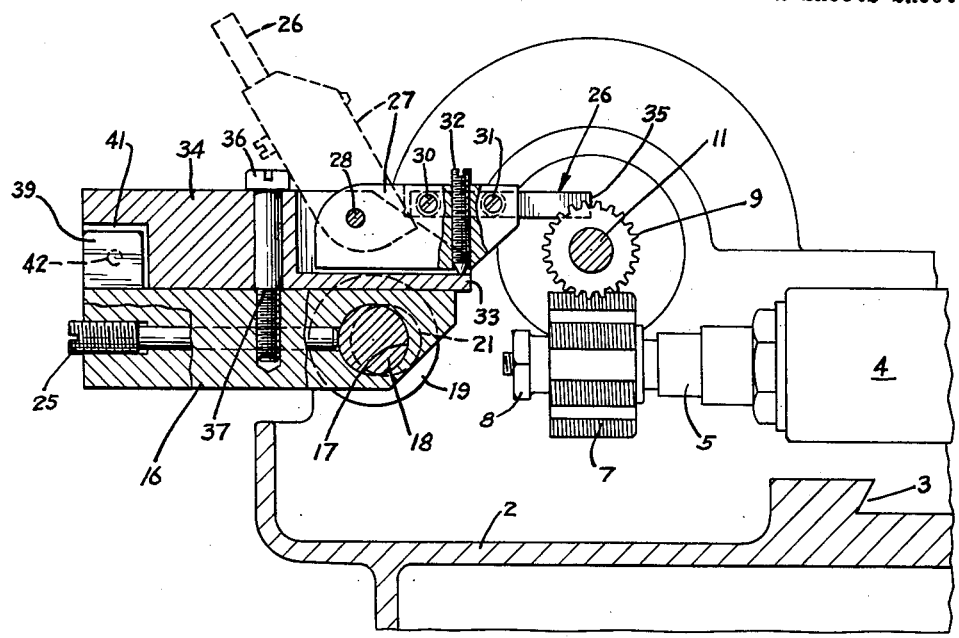
FIGURE 3 is a sectional elevation on the line 3—3 of FIGURE 2.
Figure 4:
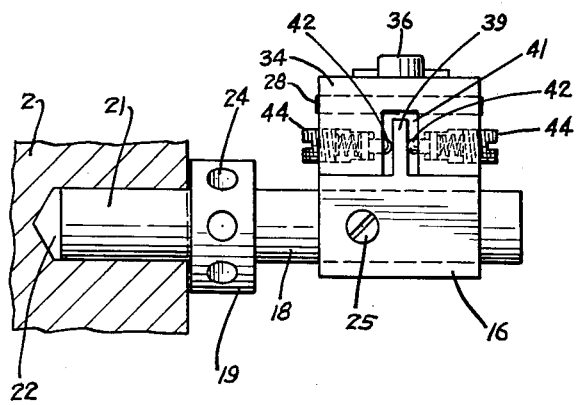
FIGURE 4 is a fragmentary view showing the eccentric upon which the base member of the attachment is adjustably secured.

In FIGURES 1, 2 and 3 there is illustrated, for purposes of disclosure, a portion of a conventional gear cutting machine comprising the usual bed 2 having V-shaped guideways 3 therein for slidably supporting the usual head 4 in which the usual arbor 5 is rotatably mounted. The arbor 5 is shown driven by a suitable drive, generally indicated by the numeral 6 in FIGURE 1. A conventional gear cutting tool or hob 7 is shown secured to the arbor 5 by such means as a nut 8, as is well known in the art. The gear or pinion 9 to be cut and deburred is shown supported on a spindle 11 having cone-shaped terminals 12 and 13 supported in correspondingly shaped centers 14 and 15, respectively, as is well known.

The novel deburring attachment herein disclosed is shown comprising a base block or member 16 having a transverse bore 17 at its forward end portion for receiving an eccentric 18, having a collar 19 fixed to one end thereof which in turn has a stud shaft 21 received in a socket or bore drilled into the machine frame, as best illustrated in FIGURE 2. A set screw 23 secures the stub shaft 21 in the bore 22. Collar 19 is shown provided with a plurality of circumferentially spaced peripheral sockets 24 for receiving a suitable tool or instrument to facilitate rotating the eccentric to adjust the position of the supporting block or member 16 relative to the gear blank or pinion 9. The base member 16 is shown secured to the eccentric 18 by a suitable set screw 25, shown in FIGURES 2 and 3.

A deburring tool, generally designated by the numeral 26, is secured in a tool holder 27, mounted for pivotal movement about a horizontal pivot pin 28, received in aligned apertures provided in the bifurcated end portion 29 of the tool holder 27. Set screws 30 and 31 secure the deburring tool 26 in position in the tool holder 27, as will be understood by reference to FIGURE 2.

The deburring tool is removably secured in the tool holder 27 by the spaced set screws 30 and 31. An adjusting screw 32 is mounted in the tool holder 27 and engages the bottom wall 33 of a pivoted block, generally designated by the numeral 34. Manipulation of adjusting screw 32 raises or lowers the deburring end 35 of the deburring tool 26, as will be readily understood by reference to FIGURE 3.

The tool holder supporting block 34 is mounted for pivotal movement about a vertical stud 36 received in threaded engagement with the base member 16, as best shown in FIGURE 3. The stud 36 is preferably shouldered as shown at 37, whereby the shoulder 37 thereof may be drawn tightly into engagement with the upper face of the base block 16 without danger of causing the pivot block 34 to bind on the base member 16, when secured thereto.

Another important feature of the invention resides in the means provided for yieldably retaining the deburring tool against the side face of the gear being deburred with just enough pressure to adequately remove the burrs therefrom with the assurance the deburring tool cannot gouge or dig into the face of the gear and damage the latter during each deburring operation. As best shown in FIGURES 2 and 3, an upstanding lug 39 is provided on the rear end of base member 16, and is received in a recess 41 provided at the rear end of the pivot block 34.

The recess 41 is relatively wider than the width or thickness of the upright lug 39 of the base member 16, thereby to permit limited lateral movement of lug 39 within recess 41. Opposed spring loaded studs 42 are mounted in the rear end portion of pivot block 34 and have their terminals projecting into recess 41 in engagement with the upright lug 39 of the base member 16. Said studs are held against said lug with a yielding pressure by suitable springs 43, having their outwardly directed ends engaging suitable adjusting elements or screws 44, as will be understood by reference to FIGURE 2. Manipulation of screws 44 will vary the pressure exerted against the side face of the gear by the cutting tool 26.

From the foregoing, it will be noted that the deburring tool 26 may be quickly positioned to engage the side face of the gear wheel 9 with the desired touch to remove only the burrs and other fine irregularities appearing thereon. When the gear has been deburred, the deburring tool may be quickly swung rearwardly out of the way to the position indicated in dotted lines in FIGURE 3, whereby the pinion may readily be removed from the machine and a new blank substituted therefore. The pivotal mounting of the tool holder 27 also permits the hob or gear cutting tool to be quickly removed from its supporting arbor when it is desired to change from one size gear to another.

The attachment is extremely simple and inexpensive in construction, and may be assembled as a complete unit before attaching it to the gear cutting machine, which in some instances may be desirable. It has been found extremely practicable and efficient in actual use, particularly when removing burrs from very small gears and pinions designed for precision machines and equipment.

It is apparent that many modifications and variations of the invention as hereinbefore set forth may be made without departing from the spirit and scope thereof. The specific embodiments described are given by way of example only and the invention is limited only by the terms of the appended claims.

I claim as my invention:

1. A gear deburring attachment for gear cutting machines comprising a supporting member having means for adjustably securing it to the frame of the gear cutting machine, a second member pivoted to said supporting member and adapted for swinging movement thereon about a vertical axis, said second member having an enlarged upwardly directed open ended recess at its forward end, a tool holder mounted in said recess and adapted for pivotal movement about a horizontal axis, a deburring tool pivoted in said tool holder and having one end projecting therefrom into deburring relation to a gear blank supported in the gear cutting machine, means for raising or lowering the deburring tool to accurately position it with respect to the gear blank, and means for holding the deburring tool in engagement with the gear blank with a very light pressure.

2. A gear deburring attachment according to claim 1, wherein the supporting member has an upstanding element at its rear end received in a recess provided in the bottom face of said second member, and opposed spring pressed elements engaging the opposite sides of said upstanding element and arranged to constantly urge the deburring tool into deburring engagement with the gear blank.

3. A gear deburring attachment according to claim 1, wherein the supporting member is mounted on an eccentric adjustably secured to the machine frame whereby the deburring attachment may be relatively adjusted on the machine frame to accurately position the deburring tool with respect to the gear blank.

4. A mechanism for removing burrs and the like from the teeth of small gears and pinions resulting from the operation of cutting the gear teeth, an eccentrically mounted shaft means for securing said shaft against rotary movement in the machine frame, a supporting member mounted for rotary and axial adjustments on said shaft, an upright pivot pin secured in said supporting member intermediately of its ends, a tool supporting member mounted for pivotal movement on said pivot pin, a tool holder mounted for pivotal movement about a horizontal axis on said tool supporting member, means for detachably securing a deburring tool to the tool holder, and spring means engaged with the rear ends of said tool supporting member and said supporting member and constantly urging said tool supporting member in a direction to retain the deburring tool in deburring engagement with the gear wheel with a very light controlled pressure.

References Cited in the file of this patent

UNITED STATES PATENTS

| | | |
|---|---|---|
| 1,928,770 | Uhlmann et al. | Oct. 3, 1933 |
| 2,787,195 | Topolinski | Apr. 2, 1957 |
| 2,871,764 | Seavey | Feb. 3, 1959 |
| 2,921,504 | Glingener | Jan. 19, 1960 |